United States Patent [19]

Mahboob

[11] Patent Number: 5,514,396

[45] Date of Patent: * May 7, 1996

[54] PROCESS FOR THE PRODUCTION OF LOW FAT MEATS

[76] Inventor: Saba Mahboob, 1014 Aster Blvd., Rockville, Md. 20850-2039

[*] Notice: The portion of the term of this patent subsequent to Aug. 16, 2013, has been disclaimed.

[21] Appl. No.: 419,401

[22] Filed: Apr. 10, 1995

Related U.S. Application Data

[63] Continuation-in-part of Ser. No. 106,564, Aug. 16, 1993, Pat. No. 5,405,632, which is a continuation-in-part of Ser. No. 903,083, Jun. 15, 1992, abandoned, which is a continuation-in-part of Ser. No. 760,332, Sep. 16, 1991, abandoned, which is a continuation-in-part of Ser. No. 679,286, Apr. 2, 1991, abandoned.

[51] Int. Cl.⁶ .............................. A23L 1/31; A23L 1/317
[52] U.S. Cl. ..................... 426/243; 426/417; 426/641; 426/646
[58] Field of Search ..................... 426/241, 242, 426/243, 246, 417, 480, 520, 523, 641, 646

[56] References Cited

U.S. PATENT DOCUMENTS

| | | | |
|---|---|---|---|
| 2,980,544 | 4/1961 | Mills | 426/241 |
| 3,674,504 | 7/1972 | Lane | 426/243 |
| 3,780,191 | 12/1973 | Langer | 426/480 X |
| 3,906,115 | 9/1975 | Jeppson | 426/243 |
| 4,353,929 | 10/1982 | Flavan et al. | 426/243 |
| 4,847,099 | 7/1989 | Elinsky | 426/417 X |
| 4,948,607 | 8/1990 | Margolis | 426/417 X |
| 4,980,185 | 12/1990 | Small | 426/417 |

*Primary Examiner*—Arthur L. Corbin

[57] ABSTRACT

Kilogram quantities of raw meats are exposed to electromagnetic radiation of suitable frequencies generated, at suitable rates, expressed in Joules per second, to form a meat juice containing fat and nutrients. The heated meat is separated from the meat juice, the meat juice is separated into a fat layer and an aqueous layer containing nutrients, the aqueous layer is added to the previously heated meat to form a mixture, and the mixture is heated to allow the meats to absorb the aqueous layer to produce low fat meat products.

9 Claims, No Drawings

PROCESS FOR THE PRODUCTION OF LOW FAT MEATS

This application is a continuation in part of the prior application Ser. No: 08/106,564, now U.S. Pat. No: 5,405,632, filed on Aug. 16, 1993, which was a continuation-in-part of Ser. No: 07/903,083 filed on Jun. 15, 1992 now abandoned; which was a continuation-in-part of Ser. No: 07/760,332 filed on Sep. 16, 1991, now abandoned; which was a continuation-in-part of Ser. No: 07/679,286 filed on Apr. 2, 1991, now abandoned.

BACKGROUND OF THE INVENTION

Several studies have reported association between dietary lipids and the risk of coronary heart disease. Apart from genetic factors, high fat and cholesterol content of the American diet has been considered a leading cause of coronary heart disease. Controlling the amount of cholesterol and fat in the diet is important in preventing coronary heart disease.

Conventional methods of cooking meat do not decrease the amount of fat in the cooked meat dishes to a desirable low level of fat. The data in table 1 are arranged on the basis of information published in the U.S. Department of Agriculture Handbook Number 8–13, May 1990. These data illustrate that when three specimens, (A), (B) and (C), of raw ground beef with fat contents of 26.55%, 23.19% and 17.07% are cooked, by several methods, a substantial amount of fat is left behind in the cooked meat. Fat contents of the products, from specimens (A) and (C), by methods 1–5 of this process have been described and compared in other tables.

TABLE 1

Fat [1] content of raw ground beef and products.

| Specimen | Weight g | Fat g | % Fat in product | % Initial fat retained in product |
|---|---|---|---|---|
| Raw ground beef | 100 (A) | 26.55 (A) | | |
| Broiled, medium | 67 | 13.90 | 20.69 | 52.2 |
| Broiled, well done | 60 | 11.68 | 19.46 | 44.0 |
| Baked, medium | 70 | 14.65 | 20.93 | 55.0 |
| Baked, well done | 56 | 12.00 | 21.47 | 45.3 |
| Pan-fried, medium | 68 | 15.34 | 22.56 | 57.8 |
| Pan-fried, well done | 61 | 11.54 (A) | 18.92 (A) | 43.5 (A) |
| Raw ground beef patties, frozen | 100 (B) | 23.19 (B) | | |
| Broiled, medium | 69 | 13.60 (B) | 19.65 (B) | 58.6 (B) |
| Raw beef ground extra lean, | 100 (C) | 17.06 (C) | | |
| Baked, medium | 76 | 12.27 | 16.14 | 72.0 |
| Baked, well done | 59 | 9.43 (C) | 15.98 (C) | 55.3 (C) |
| Broiled, medium | 74 | 12.10 | 16.33 | 71.0 |
| Broiled, well done | 62 | 9.80 | 15.80 | 57.4 |
| Pan-fried, medium | 75 | 12.30 | 16.42 | 72.0 |
| Pan-fried, well done | 65 | 10.40 | 15.95 | 61.0 |

See table 2 for comparison of lowest fat containing products from raw specimens (A) and (C).

Prior Art

Methods of producing lean meat by modifying or supplementing animal feeds have been described by Asato and Ross in U.S. Pat. No. 4,649,158 Mar. 10, 1987, by Gardner-Carimi et al in U.S. Pat. No. 4,780,327, Oct. 25, 1988, by Baker in U.S. Pat. No. 4,792,546 Dec. 20, 1988 and by Hofmeister in U.S. Pat. No. 4,826,692 May 2, 1989.

Hohenster and Hohenster described a process for preparing low fat meat products (sausages) in U.S. Pat. No. 4,504,515, March 12, 1985. Kezler described a process for bacon-like meat products of reduced fat content in U.S. Pat. No. 3,890,451, June 17, 1975, and in U.S. Pat. No. 4,057,650, Nov. 8, 1977. Methods for separating fat from lean meat were described by Langer and Langer in U.S. Pat. No. 3,780,191, Dec. 18, 1973. Roth describes the separation of fat from frozen beef in U.S. Pat. No. 4,201,302, May 6, 1980. Olson and Podebradsky describe a method for meat products with high polyunsaturated fat content in U.S. Pat. No. 3,649,300, Mar. 14, 1972.

in U.S. Pat. Nos. 3,614,365, Oct. 19, 1971, and 3,674,504, Jul. 4, 1972, Lane described the use of infrared and microwave energy to preheat and cook bacon, but he, like several other inventors, did not use these heat sources to separate the harmful fat from the meat.

Jeppson, in U.S. Pat. No. 3,906,115, Sep. 16, 1975, described an elegant mass production method with a highly mechanized system for preparation of "Precooked Heat and Serve Meats" using steam, hot air, microwave energy and hot air for drying. Jeppson described the use of microwave energy and the production of meat fat as a byproduct. Jeppson described the use of microwave to heat and serve bacon, sausage, spareribs, strips of beef, turkey, ham, and fish, and to salvage fats from butchering operations.

Flavan, Jr., et al. in U.S. Pat. No. 4,353,929, Oct. 12, 1982, described an elaborate mechanized scheme and apparatus, electrically heated, to enable a busy chef to cater to several different orders of various meats within a reasonable time. Although the patent refers to radiation and electric current for cooking meat, it did not make use of heat or electromagnetic radiation specifically for separating fats from the meat.

Elkins, in U.S. Pat. No. 4,847,099, Jul. 11, 1989, described an apparatus and a method for defeating and cooking meat. The principal feature of this process is that the meat surface is never contacted by a source of heat in excess of approximately 100 C. Elinsky's invention concerns the pot used for steaming the meats which leads to separation of some fat during the cooking process.

Geoffrey Margolis, in U.S. Pat. No. 4,948,607, Aug. 14, 1990, described an elaborate apparatus for removing fat from hamburgers as a continous large scale process in which pressure is applied to expel the fat from the hamburger. This elaborate process used electrical energy and not electromagnetic radiation or microwave or a certain frequency. Margolis did not return the nutrients to the hamburgers. Small, in U.S. Pat. No. 4,980,185, Dec. 25, 1990, described a method for reducing the cholesterol and saturated fat content of meat and fowl.

SUMMARY OF THE INVENTION

The purpose of this invention is to reduce further the amount or fat in cooked meat without compromising the nutritional integrity of the product.

This invention is related to a general process for the production of low fat meats from raw meats, utilizing usual means of heating and by exposure to electromagnetic radiation of various frequencies generated at various rates, expressed in Joules per second. The process consists of heating raw meats, in a dish, alone or with water to coagulate the meat proteins and to disrupt the lipid-protein bonds. Coagulation of proteins begins around 70° C. In my prior application I used temperatures around 95°–97° C. Now I have discovered that I can use temperatures as low as 77° C. when I apply electromagnetic radiation. The meat to be processed is placed in a dish and heated at a temperature and for a time period sufficient to liquify the fat and to allow it to flow out of the meat along with meat juice. The juice, including the saturated and unsaturated fat, is recovered in the dish.

In one embodiment of this invention, a mixture of ground meat and water is heated on an open stove, at atmospheric pressure, in a saucepan and stirred frequently. If the source of heat is electromagnetic radiation, then the meat is placed in a covered dish, heated and stirred. When ground meat patties are heated by electromagnetic radiation, the heating process is interrupted, the meat patties are turned over, and the above process is repeated. When electromagnetic radiation is used, the raw meat or patties are placed in a covered dish to allow the volatiles to remain in the dish and to condense, on cooling, before ground beef is stirred or steaks, patties and meat balls are turned over. Use of a covered dish prevents the volatiles from contaminating microwave equipment, and it is a safety measure as well. It might be feasible in the future to use large automated microwave ovens equipped with gas or steam inlets, outlets, conveyors, turntables, covered turntables, shakers or stirrers. Alternatively the meat may be rotated about one or both of its horizontal axes while it is heated to ensure even heating and defatting. The liquid that is recovered from the dish in the aforesaid treatment is placed in a separatory funnel and allowed to settle in two layers. The aqueous layer is removed and returned to the meat. The meat juice can also be centrifuged, the fat layer siphoned, or the aqueous layer removed as in a separatory funnel. The aqueous phase is separated from the liquid fat and returned to the meat to restore the useful nutrients to the meat. This mixture of meat and the aqueous layer of fat free juice is allowed to simmer until the liquid is absorbed by the heated meat.

While not wanting to be bound by any specific theory, it is believed that when electromagnetic radiation is used it increases the rotational movement of the water molecules, which produces heat which releases the fat at temperature lower than temperatures required in other methods of cooking. The fat, eliminated from the meat by this process, solidifies at room temperature. Thus by subjecting raw meat to this process the total fat content of the meat is diminished by about 75% of the amount of fat Initially present in the raw meat containing 27% of fat.

The electromagnetic radiation method for reducing fat content of ground meats having a high fat content is nutritionally, environmentally and economically more advantageous than the conventional methods. In conjunction with electromagnetic radiation use of spices and other ingredients gives a traditional brown color to the products. Fresh spices and paste of dry spices, such as onions, garlic, ginger, red and green chili peppers, give soft moist products. This process gives the traditional light brown patties and meat balls and steaks after the aqueous layer is combined with the heated meat.

In all methods I used, including the electromagnetic radiation, there was no spoilage or deterioration in the taste on storage in the domestic refrigerator for 2 weeks, or for one year in the freezer compartment. No oils, solvents or chemicals were used in this process to extract fat from raw meats. Those who like the flavor of fat can sauté low fat patties and meat balls, produced by this process, in a small amount of corn oil or any other oil.

In another version of the process ground meat with water, seasoning and spices is heated slowly at atmospheric pressure to about 95° C., and the temperature is held above 95° C. with stirring until the opaque liquid becomes clear. Meat proteins begin to change around 70° C. The heated meat is then strained, and pressed to expel the liquid. The liquid is allowed to settle into two layers. The aqueous layer is returned to the ground meat and allowed to simmer until all the liquid is absorbed by the cooked meat, thus making sure no nutrients are lost during the process, in which 53% of the original fat has been isolated.

In a further modification of the present method, meats such as stew beef and pot roast are heated under pressure for a suitable time and allowed to coot to 60°–70° C. The aqueous phase is separated from the fat and returned to the meat and absorbed in the meat by heating the mixture gently. About 49% of the fat present in the meat was isolated.

The purpose in removing the excess fat is to reduce the amounts of cholesterol, myristic and palmitic acids and to make sure that sufficient amounts of essential fatty acids, including linoleic, gamma linolenic and arachidonic acid are left behind in the processed meat.

Results of analyses of fat in raw meat specimens and the product obtained from them are presented in table 2. These specimens were representative of the raw meat used and the products obtained. The fat eliminated from meat in these experiments was also analyzed.

The data in tables 6–8 and 10–12 show that the goal of reducing the total amount of fat, myristic, palmitic, and trans 18:1 and 18:2 acids has been achieved, along with a 13 to 30% decrease in the amount of cholesterol found in the raw, regular and extra lean ground beef. The methods used were simple and inexpensive and are capable of adaptation to large scale production. Furthermore, if necessary, the process makes it possible to separate and return unsaturated fat to the product.

Comparison of the fat content of products from specimens (A) and (C) in tables 1–2, prepared by conventional cooking methods, with the fat content of the products obtained by this process shows that this process gives products with lower fat content. When raw meat with a fat content of 26.55% (A) is cooked by conventional methods, the products (table 1) have 11.54 (A) to 15.34 grams of fat, and at least 43.5% of the initial fat is retained; whereas method 5 of this process (table 2) yields a product with 6.59 (A) g fat, and only 25.4% (A) of the initial fat is retained. Similarly extra lean ground beef, of 17.06% (C) fat content, yields products with 9.43 (C) to 12. 30 grams (table 1 ) of fat and at least 55.3% (C) fat is retained in the product; while method 3 of this process gives a product with 4.96 grams of fat (table 2) and 29.1% (C) of the initial fat is retained.

DESCRIPTION OF THE METHODS AND EXAMPLES

Method 1

Comprises placing the raw meat pieces such as stew meat, pot roast and some steaks in a dish, which is heated in a pressure cooker at a pressure of 5–15 psi above the atmospheric pressure of 14.7 psi. (1 psi= $6.894757 \times 10^3$ Pa) (109°–121° C, 228°–250° F.) for a suitable length of time, usually up to 5–15 minutes but longer for tough meats. The length of time is determined by the amount and cut of the meat.

No water is added to the meat but a small amount of water is placed in the pressure cooker before heating. After heating the pressure cooker is allowed to cool until the pressure becomes equal to the atmospheric pressure. Meat pieces are picked out and the warm juice containing the separated fat is poured from the dish into a separatory funnel through a regular funnel lined with four layers of cheese cloth or gauze. The liquid fat layer rises to the top. The bottom aqueous layer is returned to the cooked meat and gently heated until the juice (without fat) is absorbed by the meat. Care is taken not to overheat or overdry the meat. Before heating, the meat can be placed in the dish with water or put directly with water in the pressure cooker.

Beef round steak full cut bone in, 2122.5 g, in a Corning Ware dish was placed in a pressure cooker containing 1250 ml water and heated at 15 psi for 20 minutes. Sludge 253.8 g, 11.97%; fat was 61 g, 2.87%; trim 137 g, 6.45%; cooked meat 1075.5 g, yield 50.67%. Aqueous layer, 565 ml, was used for mushroom gravy.

Beef round steak full cut bone in, 2004.5 g, was heated with 500 ml water in a pressure cooker at 15 psi for 20 minutes. Sludge, 22g, 1.09%; trim 105.5 g, 5.26%; fat 121 g, 6.03%; yield 1011 g, 50.43%; aqueous layer was 860 ml.

Beef round steak full cut bone in, 2194.5 g, cooked with 500 ml water at 15 psi for 19 minutes. Sludge 23.5 g, 1.07%; trim 122.9 g, 5.60% fat. 113 g, 6.06% Yield 935.5 g, 51.51%; aqueous layer 860 ml.

Beef round steak full cut bone in, 1873.5 g, was cooked with 300 ml water at 15 psi for 17 minutes. Sludge, 15.5 g, 0.82%; trim 105 g, 5.63%; yield 935.5 g, 49.9%; fat 71.5 g, 3.81%; aqueous layer was 630 ml.

Beef round steak full cut bone in, 1783 g, with 286 ml water was heated at 15 psi for 10 minutes. Sludge 16.0g, 151%. trim 64g, 3.59%; yield 926g, 51.93,%; fat 70.5 g, 3.95%; aqueous layer 690 ml.

TABLE 2

Fat content of the products of methods 1, 3–5

| Raw meat g | Fat g | Product g | Fat in Product g | Product fat % | Initial fat retained in product |
|---|---|---|---|---|---|
| 100 (A) | 26.55 (A) | 52.6 | 6.59 | 12.50 (A) | 25.4% (A) |
| 100 | 18.89 | 62.5 | 7.18 | 11.49 | 38.0% |
| 100 | 17.53 | 71.5 | 4.26 | 5.96 | 24.3% |
| 100 (C) | 17.06 (C) | 67.8 | 4.96 | 7.30 (C) | 29.1% (C) |
| 100 | 14.64 | 80.6 | 5.77 | 7.16 | 39.3% |
| 100 | 12.58 | 70.0 | 5.47 | 7.81 | 43.0% |
| 100 | 7.60 | 60.3 | 4.18 | 6.93 | 55.0% |
| a100 | 27.43 | 52.6 | 9.23 | 17.55 | 39.6% | aPork specimens. Compare figures with (A) and (C) in tables 1–2 and note the decrease in fat by the methods of this process.

TABLE 3

Examples of method 1

| Raw meat g | Water added ml/g of raw | Juice ml/g of raw | Product % of raw | Fat yield % of raw | Fatty tissue |
|---|---|---|---|---|---|
| 01. Chuck 657 salt 6 g | 0.57 | 0.67 | 47.4 | 4.30 | 61 g |
| 02. Choice 550 salt 4 g | 0.27 | 0.63 | 58.0 | 1.46 | — |
| 03. Chuck 500 | 0.10 | — | 60.0 | 1.54 | 30 g |
| 04. Chuck blade 1000 | 0.10 | — | 58.0 | 3.10 | 72 g |
| 05. Chuck 690 frozen | 0.00 | 0.47 | 53.0 | 3.30 | 51 g |
| 06. Chuck 930 salt 2 g | 0.00 | 0.36 | 50.0 | 1.30 | — |
| 07. Lean stew 190 | 0.00 | — | 63.0 | 0.53 | — |
| 08. Lean stew 181 | 0.00 | — | 63.0 | 0.55 | — |
| 09. Lean stew 194 | 0.00 | — | 59.0 | 0.31 | — |
| 10. Lean stew 208 | 0.00 | — | 57.0 | 0.48 | — |
| 11. Lean stew 187 | 0.00 | — | 60.0 | 0.54 | — |
| 12. Beef rib 476 | 0.00 | 0.18 | 75.8 | 7.50 | 15 g |
| 13. Beef rib eye steak, 252 | 0.00 | 0.87 | 44.8 | 9.50 | 29 g |
| 14. Beef sirloin steak, lean 554 | 0.00 | 0.57 | 46.9 | 4.40 | 46 g |
| 15. Beef round topsteak, 434 | 0.00 | 0.36 | 49.5 | 2.07 | 23 g |
| 16. Beef top sirloin 465 | 0.00 | 0.34 | 52.5 | 5.05 | 39 g |
| 17. Beef loin strip 315 | 0.00 | 0.33 | 49.8 | 7.60 | 28 g |

In table 3 the average amount of fat recovered in experiments 1,4 and 5 was 3.6±0.6% of the raw meat. For experiments 2, 3 and 6 the average fat was 1.4±0.14% of the raw meat. In experiments 7–11 with "lean" stew beef, the average yield of fat was 0.48±0.10% of the raw meat. Raw stew beef had 7.6% fat and the product 4.81% Same lot of stew beef was used in experiments 7–11 that were performed the same day. In experiments where no water was added the meat was placed in a dish and the dish was placed in the pressure cooker containing water and heated at 10–15 psi for 10–20 minutes. Please see table 4 for fatty acid composition of the fat pooled from experiments 7–11.

TABLE 4

Fatty acid composition of raw & processed stew beef

|  | Raw meat 100 g | Product 60.4 g | Decrease in initial fat and cholesterol |
|---|---|---|---|
| Fat | 7.60 g | 4.16 g | 45.0% |
| SFA g |  |  |  |
| 14:0 | 0.02 | 0.14 |  |
| 15:0 | 0.03 | 0.02 |  |
| 16:0 | 1.58 | 0.79 |  |
| 17:0 | 0.07 | 0.06 |  |
| 18:0 | 0.69 | 0.37 |  |
| TSFA g | 2.39 | 1.27 | 38.2% |
| UFA g |  |  |  |
| 14:1 | 0.07 | 0.03 |  |
| 16:1 | 0.31 | 0.12 |  |
| 18:1 | 3.12 | 1.54 |  |
| 18:2 | 0.38 | 0.25 |  |
| 18:3 | — | — |  |
| 20:4 | 0.05 | 0.05 |  |
| TUFA g | 3.93 | 1.94 | 51.2% |
| Chol. mg | 60.8 | 59.8 | 1.6% |
| Cis |  |  |  |
| 18:1 | 2.80 | 2.30 |  |
| 18:2 | 0.32 | 0.40 |  |
| Trans |  |  |  |
| 18:1 | 0.32 | 0.26 |  |
| 18:2 | 0.04 | 0.00 |  |

Abbreviations: SFA and UFA = saturated and unsaturated fatty acids; 14:0 = zero double bonds in a 14 carbon acid. TSFA and TUFA = total saturated and total unsaturated fatty acids. 14:1 = One double bond in a 14 carbon acid, 20:4 = four double bonds in a 20 carbon acid. Chol. = cholesterol.

Method 2

This method is concerned with the separation of fat from several cuts of raw meat using electromagnetic radiation such as microwave energy as a heat source. The method works at various frequencies of the microwave region, but it is preferable to operate it from 915 MHz to 2450 MHz at 500 watts and more than 500 watts or Joules per second output. The method consists of placing the meat pieces in a dish with water and exposing them to electromagnetic radiation at 500 or more Joules per second at any suitable frequency for a suitable time which is determined by the tenderness of the cut and its quantity. The juice containing the fat is poured into a vessel or a separatory funnel or a centrifuge. The bottom aqueous layer is separated and added to the previously heated meat and cooked until the juice is absorbed by the meat.

Example of Method 2

Sandwich steak, 280 g, in 30 ml water (0.107 ml per gram of meat), was treated with electromagnetic radiation in a General Electric microwave oven model JE 211002 KW 1.25, output 625 watts or 625 Joules per second, for two minutes, turned over and the treatment repeated five times (total of 12 minutes in six steps), The juice was allowed to separate in two layers. The aqueous layer, 0.357ml per gram of steak, was added back to the steak and cooked gently until it was absorbed. Yield of the product 167 g or 60.7%. Fat yield was 0.36% of the raw meat.

Beef cubed steak, low fat cut, 269 g, was treated as above in a microwave oven for a total of ten minutes without any added water, aqueous layer was 0.204 ml per gram of raw steak; fat separated was 0.56% of raw meat and the yield of cooked steak was 56.9% of raw steak. Lean beef top round steak, 300 g, was heated, without any added water in the microwave oven for eight minutes, Aqueous layer recovered was 0.20 ml per gram of raw meat; fat separated was 0.33% of the raw meat; product was 64.3%.

General Electric microwave oven Model JE1453H001 at 800 Joules per second was used in the following experiments. Beef round steak full cut bone in, 836 g, with 84 ml water. In a Corning ware dish 25×25×5 centimeters was placed in the middle of the oven floor and cooked for 8 minutes, left for 15–30 minutes to cool, turned over and cooked for another 8 minutes. The cooked steak was taken out, the juice was poured through a fine mesh strainer, and the sludge was separated. The filtrate was separated into two layers. The aqueous layer was added back to the cooked and trimmed steak and heated gently until the aqueous layer was absorbed. Sludge 9.0 g, 1.07%; trim 20g, 2.39%; yield 445 g, 53.23%; fat 21 g, 2.51%; aqueous layer 330 ml. Bone, 53 g, was cooked separately.

Beef round steak full cut bone in, 901 g, with 90 ml water was cooked for 9 minutes, cooled for 20 minutes, turned over and heated again. After 6 minutes frothing occurred, so heating was interrupted and continued after 30 minutes to complete 9 minutes. Sludge 13.5 g, 1.5%; trim 60 g, 6.66%; yield 444 g, 49.3%; fat, 22 g, 2.44%; aqueous layer 260 ml. Bone, 54 g, was cooked separately with 53 g bone from the previous experiment in 40 ml water for 1.5 minutes; turned over and cooked for 1.5 minutes; fat 6 g, 5.6%; yield was 90.5 g.

Beef round steak full cut bone in, 1067 g, was heated with the bone and 107 ml water for 6 minutes, turned around and heated for another six minutes. After cooling the steak was turned over and heated in the same way for 12 minutes. Sludge 17 g, 1.59%; trim 14 g, 1.31%; yield 556 g, 52.10%; fat 31 g, 2.93%; aqueous layer 384 ml.

Beef round steak full cut bone in, 1099 g, was cut in 4 pieces, heated with 110 ml water for six minutes. The steak was turned over, and the dish was turned around and heated for another six minutes. It was allowed to cool, turned over and heated again for 6 minute periods twice on the other side. Sludge 20 g, 1.82%; trim 47 g, 4.28%; yield 548 g, 49.86%; fat 50 g, 4.55%; aqueous layer 430 ml. Because of fast browning of the edges in previous experiments, the steak was cut to place most pieces in the center of the dish and the microwave oven.

Beef round steak full cut, 1021 g, was processed in two portions to avoid browning and drying. A 624 g portion of the steak with 62 ml water was cooked for 6 minutes, cooled, turned over and cooked for another 6 minutes. The remaining 397.5 g were cooked with 40 ml water for 4 minutes, turned over and cooked for 5 minutes; total microwave time 21 minutes;sludge 15.5 g, 1.51%, trim 68 g, 6.65%; fat 26 g. 2.45%; yield 525 g, 51.3%; aqueous layer 305 ml.

A 591.5 g portion from beef round steak full cut bone in weighing 953.5 g, was cooked with 60 ml water for 6 minutes, turned over and cooked again. The remaining 362 g were cooked with 36 ml water for 4 minutes on each side. combined sludge 23 g, 2.41%; trim 50 g, 5.24%; fat 23 g, 2.41%; yield 506 g, 53.07%; aqueous layer 250 ml.

A 587 g, portion from beef round steak full cut bone in weighing 1140 g, was cooked with 60 ml water for 6 minutes, turned over and cooked again for 6 minutes. The remaining 553.5 g were cooked with 55 ml water for 5 minutes on each side. Combined sludge 12 g, 1.05%; trim 60.6 g, 5.31%; fat 22.5 g, 1.97%; yield 553.5 g, 48.51%; aqueous layer 450 ml.

Cooked steaks from the last three experiments, totalling 1583.5 g, appeared a bit tough. Therefore, they were placed without any water in an open Corning Ware dish, placed in a pressure cooker and heated at 15 psi for 8 minutes to give soft moist steaks.

Products were stored in the refrigerator for two weeks and showed no signs of deterioration in taste or aroma. Products stored in the freezer compartment for 6–12 months exhibited no deterioration in taste or aroma. There was no incident of spoilage or contamination of a single product during five years of experiments.

Method 3

Consists of mixing raw ground meat (with or without added salt or spices, etc.) with a suitable quantity of water, 0.1 ml to 0.6 ml per gram of ground meat, gently heating, with stirring, to about 95° C., and holding at above 95° C. for 2 or more minutes at atmospheric pressure. Raw meat proteins begin to change around 70° C. which is lower than 95° C. The ground beef-water slurry, which is opaque, becomes clear, marking the end of the defatting process. Eighteen experiments using 300 to 639 g "extra lean" ground beef per experiment yielded between 5.2 and 12.1% fat. The average yield of fat was 8.0±2.0%, indicating that 47% of the total fat present in extra lean ground beef was eliminated.

TABLE 5

Examples of method 3

| Raw meat [1]specimen g | Water added ml/g of raw | Product yield % of raw | Juice ml/g of raw | Fat yield % of raw |
|---|---|---|---|---|
| 01. 639 | 0.29 | 70.9 | 0.69 | 10.6 |
| 02. 616 | 0.61 | 68.9 | 0.76 | 8.3 |
| 03. 625 | 0.40 | 72.5 | 0.52 | 9.1 |
| 04. 611 | 0.41 | 74.0 | 0.53 | 10.7 |
| 05. 500 | 0.39 | 66.0 | — | 8.0 |
| 06. 500 | 0.40 | 70.0 | — | 6.9 |
| 07. 300 | 0.20 | 73.3 | 0.47 | 7.7 |
| 08. 300 | 0.20 | 70.0 | 0.70 | 9.2 |
| 09. 300 | 0.20 | 73.3 | — | 8.5 |
| 10. 300 | 0.20 | 77.6 | — | 8.7 |
| 11. 300 | — | 66.7 | — | 8.3 |
| 12. 488 | — | 67.8 | — | 12.1 |
| 13. 570 | — | 71.0 | — | 6.5 |
| 14. 615 | — | 70.0 | — | 5.5 |
| 15. 537 | — | 72.6 | — | 5.2 |
| 16. 578 | — | 66.8 | — | 5.3 |
| 17. 572 | 0.30 | 74.0 | 0.33 | 6.3 |
| 18. 586 | 0.30 | 76.6 | 0.46 | 6.4 |

[1]Extra lean ground beef specimens 1–4 and 12–18; ground round specimens 5–6; ground beef specimens 7–11.

TABLE 6

Fatty acid [1]composition of raw and processed meat by method 3.

| | Raw meat 100 g | Product 70 g | Decrease in initial fat and cholesterol |
|---|---|---|---|
| Fat | 12.58 g | 5.47 g | 56.5% |
| SFA g | | | |
| 14:0 | 0.38 | 0.14 | |
| 15:0 | 0.06 | 0.02 | |
| 16:0 | 2.92 | 0.92 | |
| 17:0 | 0.13 | 0.05 | |
| 18:0 | 1.47 | 0.56 | |
| TSFA g | 4.96 | 1.69 | 65.9% |
| UFA g | | | |
| 14:1 | 0.13 | 0.05 | |
| 16:1 | 0.52 | 0.21 | |
| 18:1 | 5.26 | 2.15 | |
| 18:2 | 0.37 | 0.02 | |
| 18:3 | — | — | |
| TUFA g | 6.28 | 3.73 | 58.4% |
| Chol. mg | 62.50 | 52.15 | 16.6% |
| Cis | | | |
| 18:1 | 4.94 | 2.89 | |
| 18:2 | 0.32 | 0.25 | |
| Trans | | | |
| 18:1 | 0.32 | 0.18 | |
| 18:2 | 0.05 | 0.03 | |

[1]Specimen 8 in table 5.

Method 4

General Electric Microwave oven, model JET 211002 KW 1.25, output 625 watts, manufactured in January 1986, was used. In this method three batches of 200 grams extra lean ground beef in 100 ml water (0.5 ml per gram of meat) were treated with electromagnetic radiation at over 500 Joules per second at a suitable frequency for one minute, stirred, and the treatment repeated three times. The resulting mixture of meat and juice containing the liquid fat, nutrients and water, was poured into a strainer. Ground beef was pressed with the bottom of a heavy glass, or a pestle, and then squeezed to expel as much liquid from the treated ground beef as possible. The liquid was poured into a separatory funnel, and the fat was separated from the aqueous layer. The aqueous layer was added to the heat treated ground beef, from which the juice containing the fat had been filtered. The mixture of heat treated ground beef and the fat free aqueous layer containing the nutrients was gently cooked, giving moist low fat ground beef. The average fat yield was 11.16±1.02%.

When the temperature probe, supplied with a General Electric Model JE 1453 H001 KW 1.45, 800 watt microwave oven, manufactured in June 1988, was used, temperature measurements took more time and the temperature readings recorded after stirring were only approximate.

Raw ground meat and preparations were heated in a covered Corning Ware dish placed in the middle of the oven floor. The top shelf in the latter model was not used.

Ground beef 73% lean, 254 g, with 125 ml water was treated with electromagnetic radiation at 800 Joules per second for 3 minutes. The mixture was stirred and treated for another 2 minutes, and poured through a strainer. Sludge was negligble. Fat 44 g, 17.32%; aqueous layer 220 ml. Yield after cooking with the aqueous layer was 176 g, 69.29%. Fat eliminated was 64% of the initial fat content of the raw meat.

Specimens of ground chuck from the same lot were used in the following three experiments. Ground chuck, 1707 g, was mixed with 50 ml fresh lemon juice, 174 g fresh ground onions, and 51 g of hot green pepper ground in 51 ml of water. Then 36 grams of a 1 to 1 ratio of ginger and garlic, ground in equal amount of water, were added and mixed.

Twenty 100 g patties and one 44 g patty were made from the above mixture of ground beef and spices weighing 2069 g. Five batches of 4 patties each were cooked for 4 minutes, allowed to cool for 10 minutes, turned over and cooked for 4 minutes again. Small patty was cooked for one minute on each side. The juice was poured into a fine mesh strainer to remove sludge, 59 g, 2.85%, aqueous layer measured 425 ml, 20.54% Yield of patties after cooking with the aqueous layer was 1112 g or 65% of the raw meat. Fat eliminated was 175 g, 10.25%, or 51.25% of the initial fat.

Ground chuck, 1195 g, was mixed with 156 g onions ground in 36 ml water, 36 ml lemon juice, and made into 22 patties weighing 60 g each, and one patty weighing 53 g. Two batches of 8 patties were treated with electromagnetic radiation for 5 minutes, turned over and treated again for the same time. The third batch was treated for 4 minutes 50 seconds on each side. Patties, after cooking with the 280 ml aqueous layer, weighed 681 g; yield, 57% of the raw ground chuck. Fat eliminated weighed 156 g, or 65% of the initial fat content of the raw ground chuck.

Ground chuck, 1200 g, was mixed with 148 g onions ground with 36 ml water, 36 ml lemon juice, and 36 g fresh ground ginger and garlic. The mixture, 1456 g, was made into 23 patties weighing 60 g each and one patty weighing 50 g. Three batches of eight patties were cooked for 5 minutes, allowed to cool, turned over and cooked again for 5 minutes. The fourth batch was cooked for 4 minutes 52 seconds on each side. Sludge weighed 40 g, 2.74%; product 730 g, 62.08% of raw meat, fat 160 g, 66.66% of the initial fat. Patties made with onions and other spices were softer than the patties made without spices.

TABLE 7

Fatty acid composition of raw meat and its product by method 4

|  | Raw meat 100 g | Product 71.5 g | Decrease in initial fat and cholesterol |
|---|---|---|---|
| Fat | 17.53 g | 4.26 g | 75.7% |
| SFA g |  |  |  |
| 14:0 | 0.52 | 0.10 |  |
| 15:0 | 0.06 | 0.01 |  |
| 16:0 | 3.80 | 0.83 |  |
| 17:0 | 0.15 | 0.03 |  |
| 18:0 | 2.21 | 0.43 |  |
| TSFA g | 6.74 | 1.40 | 79.2% |
| UFA g |  |  |  |
| 14:1 | 0.51 | 0.03 |  |
| 16:1 | 0.69 | 0.18 |  |
| 18:1 | 7.47 | 1.69 |  |
| 18:2 | 0.59 | 0.33 |  |
| 20:1 | 0.04 | — |  |
| 20:4 | — | 0.04 |  |
| TUFA g | 9.30 | 2.23 | 76.0% |
| Chol. mg | 64.3 | 48.0 | 25.0% |
| Cis |  |  |  |
| 18:1 | 6.90 | 2.22 |  |
| 18:2 | 0.54 | 0.23 |  |
| Trans |  |  |  |
| 18:1 | 0.55 | 0.15 |  |
| 18:2 | 0.10 | 0.03 |  |

TABLE 8

Fatty acid [1]composition of raw and processed mini patties by method 4.

|  | Raw meat 100 g | Product 62.0 g | Decrease in initial fat and cholesterol |
|---|---|---|---|
| Fat | 18.89 g | 7.18 g | 62.0% |
| SFA g |  |  |  |
| 14:0 | 0.57 | 0.2 |  |
| 15:0 | 0.07 | 0.02 |  |
| 16:0 | 4.15 | 1.48 |  |
| 17:0 | 0.17 | 0.05 |  |
| 18:0 | 2.43 | 0.81 |  |
| TSFA g | 7.39 | 2.56 | 65.4% |
| UFA g |  |  |  |
| 14:1 | 0.41 | 0.06 |  |
| 16:1 | 0.72 | 0.25 |  |
| 18:1 | 7.38 | 2.99 |  |
| 18:2 | 0.62 | 0.27 |  |
| 18:3 | — | — |  |
| 20:1 | — | 0.03 |  |
| 20:4 | — | 0.03 |  |
| TUFA g | 9.13 | 3.80 | 58.4% |
| Chol. mg | 61.6 | 53.6 | 13.0% |
| Cis |  |  |  |
| 18:1 | 7.38 | 4.45 |  |
| 18:2 | 0.54 | 0.38 |  |
| Trans |  |  |  |
| 18:1 | 0.62 | 0.33 |  |
| 18:2 | 0.08 | 0.05 |  |

[1]Extra lean ground beef mini patties, one of four experiments by method 4.

Method 5

While in Method 4 ground meats are treated with electromagnetic radiation in the presence of water, in Method 5 ground meat and ground meat preparations are treated with electromagnetic radiation with or without water. Patties of "extra lean" ground beef ( 4×50 grams each) in 200 ml water were treated with electromagnetic radiation of the same frequency as described in method 2 for two minutes, turned over, and treated again for two minutes. The patties were lifted, and the liquid was filtered through a fine mesh strainer and poured into a separatory funnel. The aqueous layer was separated from the liquid fat layer, added to the patties and cooked until the aqueous layer was absorbed. The yield of fat from four batches was 10.8±1.3%.

Examples of Method 5

Eight patties were made from 1018 g specimen 14 (table 9). Four patties at a time were treated with electromagnetic radiation for four minutes, turned over and treated again. Twelve groups of "73% lean" ground beef patties, (including meat balls and patties with spices) when treated with electromagnetic radiation at 625 to 800 Joules per second at a frequency of 2450 MHz, without any added water, gave 16.8 ±1.6% fat, or 62% of the total fat initially present in meat.

Two batches each of "extra lean" ground beef patties and meat balls were also treated by electromagnetic radiation of the same frequency as mentioned in method 2, without adding any water. These showed a loss of 8.8% fat, or 51.7% of the total fat initially present.

TABLE 9

Examples of method 5

| | Raw ground beef | Water added ml/g of raw | Product yield % of raw | Juice ml/g of raw | Fat yield % of raw |
|---|---|---|---|---|---|
| 01. | 5 × 100 g patties | 0.0 | 78.0 | 0.12 | 4.9 |
| 02. | 460 g | 0.5 | 86.9 | 0.33 | 5.3 |
| 03. | 960 g | 0.0 | — | — | 8.8 |
| 04. | 1 Kg spicy meat balls | <0.1 | 88.0 | — | 8.9 |
| 05. | 680 g spicy meat balls | <0.1 | 73.9 | — | 16.7 |
| 06. | 362 g spicy meat balls | <0.1 | 79.9 | — | 15.8 |
| 07. | 4 × 100 g patties | 0.0 | 48.0 | — | 16.7 |
| 08. | 4 × 113 g patties | 0.0 | 48.3 | — | 16.7 |
| 09. | 4 × 113 g patties | 0.0 | 51.3 | — | 18.2 |
| 10. | 453 g | 0.0 | 52.6 | — | 19.9 |
| 11. | 453 g spicy patties. | <0.1 | 66.7 | — | 16.3 |
| 12. | 453 g spicy patties | <0.1 | 65.6 | — | 18.3 |
| 13. | 169 g spicy meat balls | 0.1 | 69.0 | — | 13.5 |
| 14. | 1018 g 8 patties | 0.0 | 60.0 | 0.05 | 16.2 |
| 15. | 468 g | 0.0 | 56.5 | 0.16 | 16.7 |
| 16. | 460 g | 0.0 | 58.2 | 0.10 | 16.7 |

Specimens 1–4, extra lean ground beef. Average amount of fat eliminated from 12 specimens (5–16) of 73% lean ground beef patties and meat balls was 16.8 ± 1.6%.

TABLE 10

Fatty acid [1] composition of raw and processed ground beef patties by method 5.

| | Raw meat 100 g | Product 52.6 g | Decrease in initial fat and cholesterol |
|---|---|---|---|
| Fat | 26.55 g (A) | 9.23 g (A) | 65.0% |
| SFA g | | | |
| 14:0 | 0.80 | 0.25 | |
| 15:0 | 0.12 | 0.04 | |
| 16:0 | 6.67 | 2.16 | |
| 17:0 | 0.26 | 0.08 | |
| 18:0 | 3.58 | 1.13 | |
| TSFA g | 11.69 | 3.66 | 68.7% |
| UFA g | | | |
| 14:1 | 0.33 | 0.11 | |
| 16:1 | 1.17 | 0.41 | |
| 18:1 | 10.8 | 1.61 | |
| 18:2 | 0.64 | 0.47 | |
| 18:3 | 0.08 | — | |
| TUFA g | 13.02 | 2.60 | 80.0% |
| Chol. mg | 80.5 | 56.3 | 30.0% |
| Cis | | | |
| 18:1 | 10.26 | 6.12 | |
| 18:2 | 0.54 | 0.40 | |
| Trans | | | |
| 18:1 | 0.54 | — | |
| 18:2 | 0.10 | 0.07 | |

[1] Specimen 10 in table 9.

TABLE 11

Fatty acid composition of raw and processed extra lean ground beef by method 5.

| | Raw meat 100 g | Product 80.6 g | Decrease in initial fat and cholesterol |
|---|---|---|---|
| Fat | 14.64 g | 5.77 g | 60.6% |
| SFA g | | | |
| 14:0 | 0.42 | 0.15 | |
| 15:0 | 0.07 | 0.02 | |
| 16:0 | 3.25 | 1.23 | |
| 17:0 | 0.17 | 0.06 | |
| 18:0 | 1.69 | 0.62 | |
| TSFA g | 5.60 | 2.08 | 62.8% |
| UFA g | | | |
| 14:1 | 0.41 | 0.05 | |
| 16:1 | 0.54 | 0.21 | |
| 18:1 | 6.05 | 2.32 | |
| 18:2 | 0.47 | 0.24 | |
| 18:3 | 0.03 | — | |
| 20:4 | — | 0.04 | |
| TUFA g | 7.50 | 2.86 | 16.8% |
| Chol. mg | 67.8 | 57.8 | 14.7% |
| Cis | | | |
| 18:1 | 5.36 | 2.54 | |
| 18:2 | 0.41 | 0.26 | |
| Trans | | | |
| 18:1 | 0.69 | 0.34 | |
| 18:2 | 0.06 | 0.00 | |

TABLE 12

Fatty acid composition of raw and processed ground pork patties by method 5

| | Raw meat 100 g | Product 58.2 g | Decrease in initial fat and cholesterol |
|---|---|---|---|
| Fat | 27.43 g | 10.8 g | 60.6% |
| SFA g | | | |
| 14:0 | 0.37 | 0.14 | |
| 15:0 | — | — | |
| 16:0 | 6.42 | 2.42 | |
| 17:0 | 0.08 | 0.03 | |
| 18:0 | 3.60 | 1.37 | |
| TSFA g | 10.47 | 4.00 | 61.8% |
| UFA g | | | |
| 14:1 | — | — | |
| 16:1 | 0.72 | 0.48 | |
| 18:1 | 11.28 | 4.30 | |
| 18:2 | 2.55 | 0.93 | |
| 18:3 | 0.09 | 0.03 | |
| 20:1 | 0.21 | 0.07 | |
| TUFA g | 14.85 | 5.61 | 62.2% |
| Chol. mg | 74.1 | 56.0 | 24.4% |
| Cis | | | |
| 18:1 | 11.24 | 7.40 | |
| 18:2 | 2.55 | 1.60 | |

TABLE 12-continued

Fatty acid composition of raw and processed ground pork patties by method 5

|  | Raw meat 100 g | Product 58.2 g | Decrease in initial fat and cholesterol |
|---|---|---|---|
| Trans |  |  |  |
| 18:1 | — | — |  |
| 18:2 | — | — |  |

TABLE 13

New examples of method 1

| Specimen | Water added ml/g of raw | Product yield % of raw | Sludge & trim % of raw | Fat yield % of raw |
|---|---|---|---|---|
| 01. 2122.5 g 20 mins at 15 psi | 0.60 | 50.67 | 10.92 | 2.87 |
| 02. 1927 g 20 mins in a cooker which had no gage | 0.13 | 50.55 | 7.32 | 5.40 |
| 03. 2004.5 g 20 mins at 15 psi | 0.25 | 50.44 | 6.36 | 6.04 |
| 04. 2194.5 g 15 mins at 15 psi | 0.23 | 51.52 | 6.68 | 6.06 |
| 05. 1873.5 g 12 mins at 15 psi | 0.16 | 49.90 | 6.46 | 3.82 |
| 06. 1783 g 10 mins at 15 psi | 0.16 | 51.94 | 5.10 | 3.95 |

Beef round steaks full cut bone in; psi above the atmospheric pressure.

TABLE 14

New examples of method 4 continued

| Specimen | Water added ml/g of raw | Product yield % of raw | Sludge & trim % of raw | Fat yield % of raw |
|---|---|---|---|---|
| 01. Beef round steak, 836 g | 0.10 | 52.3 | 3.46 | 2.51 |
| 02. Beef round steak, 901 g | 0.10 | 49.3 | 8.16 | 2.44 |
| 03. Beef round steak, 1067 g | 0.10 | 52.1 | 2.90 | 2.93 |
| 04. Beef round steak, 1099 g | 0.10 | 49.9 | 6.10 | 4.55 |
| 05. Beef round steak, 1021 g | 0.10 | 51.3 | 8.15 | 2.45 |
| 06. Beef round steak, 953.5 g | 0.10 | 53.1 | 7.67 | 2.41 |
| 07. Beef round steak, 1140 g | 0.10 | 48.5 | 6.36 | 1.97 |
| 08. Ground chuck, 80% lean, 1707 g | 0.28* | 65.0 | 2.85 | 10.25 |
| 09. Ground chuck, 80% lean, 1195 g | 0.19* | 57.0 | 0.04 | 13.05 |
| 10. Ground chuck, 80% lean, 1200 g | 0.21* | 60.83 | 0.03 | 13.33 |

*Specimen 8, 100 g patties; specimens 9–10, 60 g patties. Water added in specimens 8–10 includes the water used to grind fresh spices.

TABLE 15

New Examples of method 4 continued

| Ground beef | Time Joules/sec. | Water added ml/g of raw | Product yield % of raw | Fat yield | Initial fat eliminated |
|---|---|---|---|---|---|
| 01. 107 g patty 28% fat | 2 mins 625 | 0.18 | — | 12.8 g | 42.7% |
| 02. 227 g 2 patties 28% fat | 4 mins 625 | 0.18 | — | 19.0 g | 29.9% |
| 03. 102 g patty 28% fat | 2 mins 800 | 0.20 | — | 11.0 g | 38.5% |
| 04. 110 g patty 28% fat | 2 mins 800 | 0.18 | — | 16.0 g | 51.9% |
| 05. 227 g 2 patties 28% fat | 2 mins 800 | 0.20 | — | 24.5 g | 40.2% |
| 06. 468 g 4 patties 20% fat | 8 mins 800 | 0.21 | 63.5 | 22.0 g | 23.5% |
| 07. 474 g 4 patties 20% fat | 8 mins 625 | 0.21 | 63.9 | 23.2 g | 24.5% |
| 08. 259 g 28% fat | 4.66 mins 625 | 0.39 | 68.3 | 52.5 g | 72.4% |
| 09. 332 g 28% fat | 6 mins 625 | 0.39 | 71.7 | 72.5 g | 78.0% |
| 10. 332 g 28% fat | 6 mins 800 | 0.39 | 66.6 | 80.0 g | 86.1% |
| 11. 282 g 20% fat | 4.66 mins 625 | 0.39 | 77.9 | 36.0 g | 63.8% |
| 12. 282 g 20% fat | 4.66 mins 800 | 0.39 | 67.8 | 38.0 g | 67.4% |

Combined product yield from 28% fat specimens 1–2 was 60.9%; combined initial fat removed was 36.3%. which included the fat recovered during the absorption of aqueous layer.

Combined yield of product from specimens 3,4, and 5 was 61.0%; combined fat includes some fat recovered in reheating with aqueous layer. Combined fat 43.5% of the initial fat.

From ground beef patties at 625 Joules/sec. 36.3% fat was recovered, and at 800 Joules/sec 43.5% fat was recovered.

The application of the methods of this invention is not limited to beef. The term meat includes all kinds and cuts of edible meats from animals, including fatty sea food such as fatty fish, shrimps, lobsters; poultry, including ducks and ostrich; kangaroo; buffalo; water buffalo; deer; moose; goat; lamb; mutton; horse and camel. The process is applicable to processed meats such as hams, hotdogs, sausages, frankfurters, salami, bologna, meat balls, patties, and corned beef for reducing their fat content.

In the preceding examples the methods of this invention have been illustrated with and without addition of water before heating the meat. In method 1, meats are heated alone or with water at elevated pressures; in method 2, meats are heated alone or with water in a microwave oven; in method 3, ground meats are heated alone or with water on a stove; in method 4, ground meats are heated alone or with water in a microwave oven. In method 5, ground meat preparations, made with or without the added water, are heated, in a microwave oven alone or in water. Addition of seasoning, spices and ingredients increases the water content of raw meat and raw ground meat preparations. All kinds of patties and meat balls are treated alone or with water in a microwave oven. The fat clinging to the product is removed by a hot water rinse. This rinse is added to the juice.

Methods based on electromagnetic radiation have eliminated a greater percentage of cholesterol from raw meat in comparison to the amount removed from the same raw meat specimens by other methods. The amount of initial fat eliminated is dependent on fat concentration, the surface area per gram of raw meat, and in some cases Joules per second at which microwaves are generated. There is a reduction in the amount of trans fatty acids in raw meat specimens processed by electromagnetic radiation. Electromagnetic radiation can change trans fatty acids to cis fatty acids. A study on cholesterol removal, effect of electrolytes on fat and cholesterol elimination from raw meat, and trans to cis isomerization of fatty acids on exposure to electromagnetic radiation is planned. Having now described preferred embodiments of this invention, in accordance with the Patent Statutes, it is not intended that it be limited except as defined in the appended claims.

I claim:

1. A process for reducing the saturated and unsaturated fat content of raw meats, raw ground meats and raw ground meat preparations, while restoring the nutrients that flow out of the meat with the fat when the raw meat is heated, consisting essentially of:
   a. heating said raw meat with about 0.0 to 0.6 ml of added water per gram of meat for a time and at a temperature between 70°–100° C. to form a meat juice and to allow the meat juice, containing saturated and unsaturated fat and nutrients from the heated meat, to flow out of the meat,
   b. separating the heated meat from the meat juice containing saturated and unsaturated fat and nutrients originally present in the raw meat,
   c. pouring the meat juice into a vessel wherein a fat layer containing saturated and unsaturated fat and an aqueous layer containing nutrients originally present in the meat are formed,
   d. separating said aqueous layer from said fat layer,
   e. adding the separated aqueous layer thus obtained to the previously heated and separated meat to form a mixture and heating the resulting mixture gently at a temperature and for a time sufficient for all of the aqueous layer to be absorbed by the meat to produce a low fat meat product with a reduced fat content as compared to the original fat content of the raw meat.

2. The process of claim 1 wherein the heating of step a. is by means of electromagnetic radiation of a suitable frequency produced at a suitable level of Joules per second.

3. The process of claim 2 comprising placing the raw meats, raw ground meats, and raw ground meat preparations in a covered dish, adding up to 0.6 ml of added water per gram of meat, and heating by electromagnetic radiation at above 500 Joules per second at a suitable frequency for at least about one minute, and then stirring or turning the meat over to ensure proper mixing and even heating.

4. The process as in claim 2 comprising transferring said meats, after treatment with electromagnetic radiation, into a fine mesh strainer, pressing and washing with 0.1–0.2 ml hot water per gram of raw meat to separate the meat juice containing the fat and nutrients, allowing the juice to stand to form a layer of fat and an aqueous layer, and adding said aqueous layer to the previously heated meats, and further heating the resultant mixture gently to allow the meats to absorb the aqueous layer.

5. The process as in claims 2 wherein the produced meat juice from the meat and ground meat preparations treated with electromagnetic radiation is poured into a strainer to separate sludge.

6. The process of claim 2 wherein electromagnetic radiation at a frequency of about 915 to 2450 MHz is applied at fixed or variable rates, expressed in Joules per second, for processing said meats in a microwave cavity equipped with one or more of the following; a stirrer, a turntable, a conveyor belt, a Ferris wheel, and a gas inlet.

7. The process of claim 1, wherein said meats to be processed are not solvent, chemical or oil treated.

8. The process of claim 1 wherein said meats are selected from any group of edible land or sea animals.

9. The process of claim 1 comprising adding seasoning, spices, fruits, vegetables and dairy products in any form, individually or in combination, to said meats before the heating of step a.

\* \* \* \* \*

UNITED STATES PATENT AND TRADEMARK OFFICE
CERTIFICATE OF CORRECTION

PATENT NO. : 5,514,396

DATED : May 7, 1996

INVENTOR(S) : Saba Mahbooh

It is certified that error appears in the above-identified patent and that said Letters Patent is hereby corrected as shown below:

Col.1 Table 1, insert a blank line to separate group (B) from (A
insert another line to separate group (B) from (C).

Col. 2 line 36, "Elkins" should read -- "Elinsky"--
line 48, change "or" to read "of"--.
Col. 7 line 3, insert "."-- after "4.81%"--.

In Tables 4,6,7,8,10,11, and 12 insert a space between "TSFA g
and UFA g".

Col 11, line 14, insert a-- "."-- after "20.54%"--.

Signed and Sealed this

Twenty-second Day of October, 1996

Attest:

BRUCE LEHMAN

Attesting Officer    Commissioner of Patents and Trademarks